United States Patent [19]

Kardal et al.

[11] Patent Number: 5,050,448
[45] Date of Patent: Sep. 24, 1991

[54] WET FLYWHEEL HOUSING

[75] Inventors: I. Bruce Kardal; Kevin A. Walker; Daniel Pakosh, all of Winnipeg, Canada; Richard W. Koning, Capac, Mich.

[73] Assignee: Ford New Holland, Inc., New Holland, Pa.

[21] Appl. No.: 417,612

[22] Filed: Oct. 5, 1989

[51] Int. Cl.$^5$ .............................................. F16H 57/04
[52] U.S. Cl. .................................. 74/606 R; 74/377; 74/572; 123/195
[58] Field of Search .................. 74/572, 606 R, 15.63; 123/196 R, 195

[56] References Cited

U.S. PATENT DOCUMENTS

| | | | |
|---|---|---|---|
| 1,789,579 | 1/1931 | D'Agostino | 74/606 R |
| 2,335,926 | 12/1943 | Fawick | 74/377 |
| 2,974,660 | 3/1961 | Kolbe | 123/195 |
| 4,050,557 | 9/1977 | Beneke | 74/572 |

Primary Examiner—Leslie A. Braun
Assistant Examiner—Winnie Yip
Attorney, Agent, or Firm—Larry W. Miller; Frank A. Seemar; Darrell F. Marquette

[57] ABSTRACT

A wet flywheel housing is disclosed wherein a central web member separates the flywheel housing into first and second cavities in which a flywheel and a driven gear set are respectively rotatable. The web member supports a seal engageable with a hubbed gear forming part of the driven gear set and connected with the flywheel to permit the transfer of rotational power therebetween. A detachable lid member closes the second cavity in which the driven gear set is rotated to permit the introduction of an oil bath into the second cavity for lubrication of the driven gear set without permitting the migration of oil to the first cavity for engagement with the rotating flywheel.

6 Claims, 2 Drawing Sheets

WET FLYWHEEL HOUSING

BACKGROUND OF THE INVENTION

This invention relates generally to engines having a flywheel and, more specifically, to a housing for the flywheel to provide an oil bath for a driven gear set engaged with the flywheel.

For engines serving as the powerplant to provide operational power for equipment such as swathers, wherein the engine drives apparatus such as a hydraulic pump, is common to provide a driven gear set in engagement with the flywheel to transfer rotational power from the flywheel to the driven apparatus. Such a driven gear set requires an oil bath for proper lubrication thereof during rotational operation, which normally requires that the flywheel housing be sealed to prevent the loss of lubricating oil therefrom. Such seals would normally be required between the flywheel and engine block, between the rear block plate and the flywheel housing and between the flywheel housing and the starter motor. Furthermore, immersing the flywheel into an oil bath results in power losses due to the drag of the flywheel assembly through the oil.

Accordingly, it would be desirable to provide a wet flywheel housing in design that would permit the proper lubrication of a driven gear set connected to the flywheel while minimizing the sealing problems and reducing the power losses due to rotation of the flywheel through an oil bath.

SUMMARY OF THE INVENTION

It is an object of this invention to overcome the aforementioned disadvantages of the prior art by providing a wet flywheel housing having separate cavities for rotatably housing the flywheel and the driven gear set, respectively.

It is another object of this invention to provide a wet flywheel housing having a central web member separating the housing into first and second cavities.

It is still another object of this invention to seal the second cavity from the first cavity to permit the introduction of oil solely into the second cavity for lubrication of the driven gear set.

It is a feature of this invention that the flywheel can be rotated in the first cavity of the wet flywheel housing without being driven through an oil bath.

It is another feature of this invention that the driven gear set can be immersed in an oil bath to provide proper lubrication thereof.

It is an advantage of this invention that the first and second cavities are separated by a web member and a seal to prevent the migration of oil into the first cavity in which the flywheel is rotated.

It is another advantage of this invention that seals between the flywheel and engine block, between the rear block plate and the flywheel housing, and between the flywheel housing and the starter motor are no longer required for a wet flywheel housing.

It is yet another advantage of this invention that the complexity of sealing a wet flywheel housing is substantially reduced.

It is still another advantage of this invention that power losses due to the drag of the flywheel housing through an oil bath are eliminated.

It is a further object of this invention to provide a wet flywheel housing which is durable in construction, inexpensive of manufacture, carefree of maintenance, facile in assemblage, and simple and effective in use.

These and other objects, features and advantages are accomplished according to the instant invention by providing a wet flywheel housing wherein a central web member separates the flywheel housing into first and second cavities in which a flywheel and a driven gear set are respectively rotatable. The web member supports a seal engageable with a hubbed gear forming part of the driven gear set and connected with the flywheel to permit the transfer of rotational power therebetween. A detachable lid member closes the second cavity in which the driven gear set is rotated to permit the introduction of an oil bath into the second cavity for lubrication of the driven gear set without permitting the migration of oil to the first cavity for engagement with the rotating flywheel.

BRIEF DESCRIPTION OF THE DRAWINGS

The advantages of this invention will become apparent upon consideration of the following detailed disclosure of the invention, especially when taken inconjunction with the accompanying drawings wherein.

DETAILED DESCRIPTION OF THE PREFERRED EMBODIMENT

Figure 1:
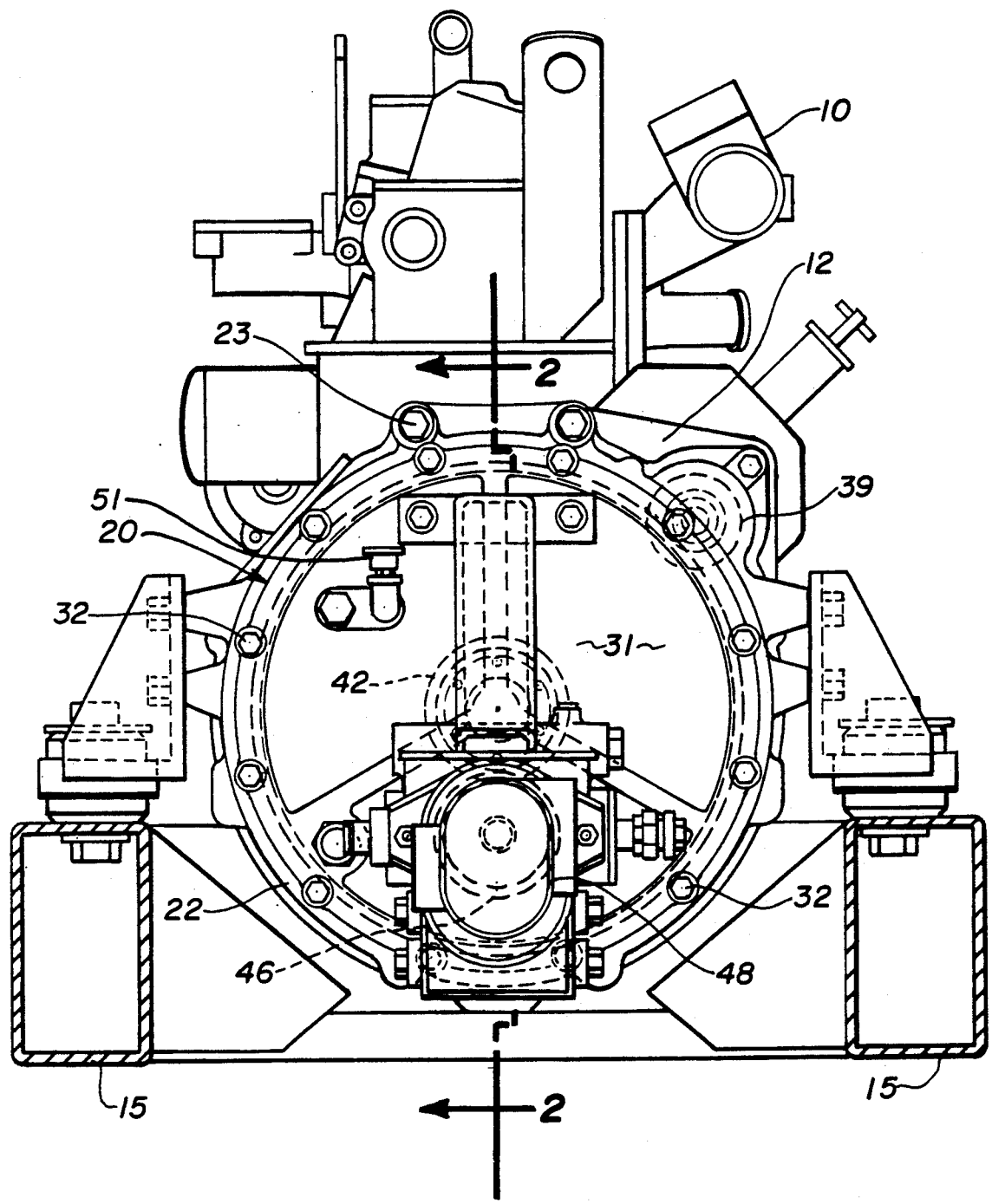
FIG. 1 is a rear elevational view of the wet flywheel housing incorporating the principles of the instant invention, the housing is shown being mounted on an a representative engine and having a hydraulic pump affixed thereto to be operably driven by the engine.

Referring now to the drawings, a wet flywheel housing 20 incorporating the principles of the instant invention can be seen. The flywheel housing 20 is connected to the engine block 12 of the representative engine 10 by bolts 23. The engine 10, in turn is mounted in a conventional manner to the frame 15 of a vehicle (not shown) to provide a source of operational power therefor.

The flywheel housing 20 includes a base member 22 and an integrally, formed recessed web member 25 forming a separating wall between a first cavity 26 and a second cavity 28. The first cavity 26 houses the flywheel 35 and is defined by the base member 22, the web member 25, and the block plate 13 adjacent to the engine block 12, allowing the flywheel 35 to be directly connected to the engine 10 in a conventional manner by bolts 36. The flywheel 35 is provided with a conventional ring gear 37 for engagement with a starter motor 39 for a conventional operational starting of the engine 10.

A lid member 31 is detachably connected to the base member 22 by a series of circumferentially spaced bolts 32 to define the second cavity 28 between the lid member 31 and the recessed web member 25. The web member 25 includes an opening 29 centrally positioned to permit the connection of a driven gear set 40 directly to the flywheel 35 to effect rotation thereof with the rotation of the flywheel 35. More specifically, the driven gear set 40 includes a hubbed gear 42 having a hub portion 43 passing through the opening 29 in the web member 25 for connection directly to the flywheel 35 by bolts 44. A double-lip seal 45 supported by the web member 25 sealingly engages the hub portion 43 of the hubbed gear 42 to effectively seal the second cavity 28 from the first cavity 26.

Figure 2:
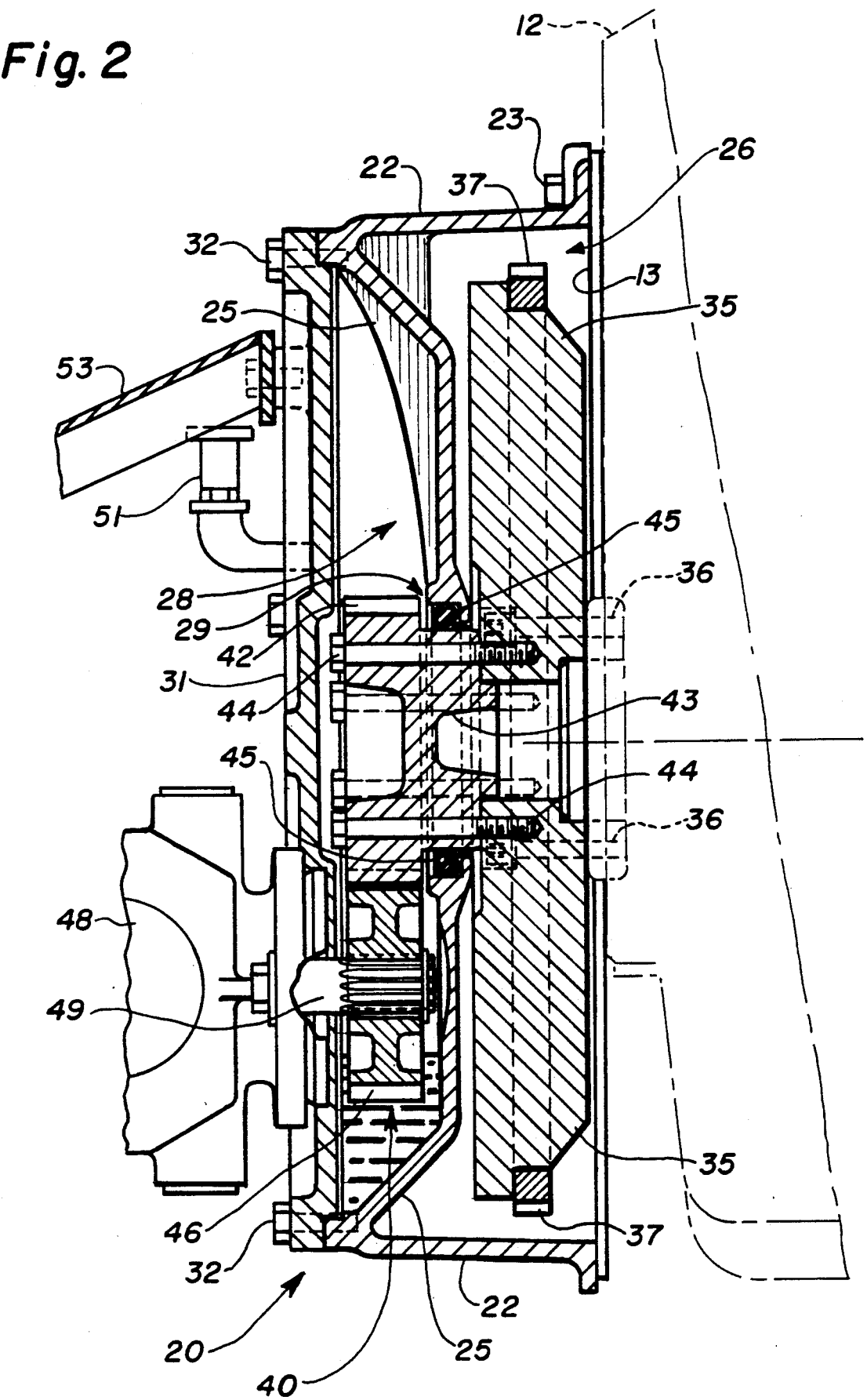
FIG. 2 is a cross-sectional view of the wet flywheel housing taken along lines 2—2 of FIG. 1, the adjacent engine block being shown in phantom and broken away, while the hydraulic pump and support arm are also broken away, for purposes of clarity.

The driven gear set 40 also includes at least one secondary gear 46 intermeshed with the hubbed gear 42 for rotation thereof with the flywheel 35. As shown in FIG. 2, the secondary gear 46 can be splined to the shaft 49 of the hydraulic pump 48 passing through the lid member 31 into the second cavity 28 to provide an operational powering of the hydraulic pump 48. It will be understood by one skilled in the art that other configurations of a hubbed gear 42 will provide a means for sealing the first cavity 26 from the second cavity 28 while providing a means for connecting the driven gear set 40 to the flywheel 35 for rotation therewith.

By sealing the engagement of the hydraulic pump 48 with the lid member 31 and by sealing the connection of the lid member 31 to the base member 22, coupled with the seal 45 between the web member 25 and the hubbed gear 42, the second cavity 28 can include an oil bath permitting proper lubrication of the driven gear set 40 rotating within the second cavity 28. The seal 45 and the integrally formed web member 25 prevent the migration of oil from the second cavity 28 into the first cavity 26 where the flywheel 35 is rotatably housed. An oil intake port 51 permits the introduction of oil into the second cavity 28 without requiring the removal of the lid member 31 from the base member 22. A brace member 53 can interconnect the flywheel housing 20 and a remote end of the hydraulic pump 48 to provide proper support thereof to maintain the oil-tight integrity of the connection of the pump 48 with the lid member 31.

Since the web member 25 separates the flywheel housing 20 into two separate cavities 26, 28, the second cavity 28 can be sealed from the first cavity 26 to permit an oil bath to properly lubricate the driven gear set 40 while the flywheel 35 rotates in a dry first cavity 26. This configuration eliminates the need for sealing the engagement of the base member 22 with the block plate 13, as well as providing special seals between the interface of the flywheel 35 with the engine block 12 and the interface between the starter motor 39 and the flywheel housing 20, as known in the prior art. Furthermore, the rotation of the flywheel 35 in a dry environment eliminates any power losses due to the drag of the flywheel assembly 35 through the oil bath of a conventional wet flywheel housing. Nevertheless, the driven gear set 40 is provided with adequate lubrication normally associated with a wet flywheel housing.

It will be understood that changes in the details, materials, steps, and arrangements of parts which have been described and illustrated to explain the nature of the invention with occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, what is claimed is:

1. A flywheel housing encapsulating a flywheel and a driven gear set transferring rotational power from an engine to a driven apparatus comprising:

a base member detachably connected to said engine and defining a first cavity adjacent said engine within which said flywheel is rotatable due to connection thereof to said engine and a second cavity within which said driven gear set is rotatable due to a detachable connection thereof to said flywheel so as to be rotatable in response to the rotation of said flywheel with said engine, said first cavity being disposed between said engine and said second cavity, said first cavity operating in a normally dry environment;

a web member in engagement with said base member to define a separating wall between said first and second cavities, said driven gear set including a hubbed gear having a hub portion directly connected to said flywheel, said web member having an opening therethrough for the passage of the hub portion of said hubbed gear for connection thereof to said flywheel, said web member supporting an oil-tight seal engageable with said hub portion and said web member to prevent the passage of oil between said first and second cavities; and a detachable lid member sealingly engageable with said base member to define with said web member said second cavity which contains an oil bath for said driven gear set without permitting a migration of oil into said first cavity and whereby said flywheel operates in a dry environment eliminating any power losses due to fluid drag.

2. The flywheel housing of claim 1 wherein said first cavity is in communication with a starter motor assembly electively engageable with said flywheel to effect a starting of said engine.

3. The flywheel housing of claim 2 wherein said driven gear set includes at least one secondary gear drivingly engaged with said hubbed gear to transfer rotational power to said driven apparatus operatively engaged therewith in said second cavity.

4. The flywheel housing of claim 3 wherein said driven apparatus is a hydraulic pump having a shaft extending through an opening in said lid member into engagement with said at least one gear to receive rotational power therefrom, said opening having sealing means associated therewith to prevent the passage of oil from said second cavity.

5. The flywheel housing of claim 1 wherein said web member is integrally formed with said base member.

6. The flywheel housing of claim 5 wherein the seal between said web member and the hub portion of said hubbed gear is a double-lip seal.

* * * * *